(12) United States Patent
Steigerwald et al.

(10) Patent No.: US 9,290,097 B2
(45) Date of Patent: Mar. 22, 2016

(54) APPARATUS FOR TRANSFERRING ENERGY USING ONBOARD POWER ELECTRONICS WITH HIGH-FREQUENCY TRANSFORMER ISOLATION AND METHOD OF MANUFACTURING SAME

(76) Inventors: Robert Louis Steigerwald, Burnt Hills, NY (US); Robert Dean King, Schenectady, NY (US); Ruediger Soeren Kusch, Clifton Park, NY (US)

( * ) Notice: Subject to any disclaimer, the term of this patent is extended or adjusted under 35 U.S.C. 154(b) by 1017 days.

(21) Appl. No.: 12/940,110

(22) Filed: Nov. 5, 2010

(65) Prior Publication Data

US 2012/0112702 A1    May 10, 2012

(51) Int. Cl.
*H02J 7/14*    (2006.01)
*B60L 11/00*   (2006.01)
(Continued)

(52) U.S. Cl.
CPC ............. *B60L 11/005* (2013.01); *B60L 3/0069* (2013.01); *B60L 7/14* (2013.01); *B60L 11/123* (2013.01); *B60L 11/1812* (2013.01); *B60L 11/1816* (2013.01); *B60L 2210/12* (2013.01); *B60L 2210/14* (2013.01); *B60L 2210/30* (2013.01); *B60L 2210/40* (2013.01); *B60L 2220/42* (2013.01); *Y02T 10/6217* (2013.01); *Y02T 10/646* (2013.01); *Y02T 10/648* (2013.01); *Y02T 10/7005* (2013.01); *Y02T 10/7022* (2013.01);
(Continued)

(58) Field of Classification Search
CPC .................................................... Y02T 90/127
USPC ................................................. 320/137, 104
See application file for complete search history.

(56) References Cited

U.S. PATENT DOCUMENTS

| 5,373,195 A | 12/1994 | De Doncker et al. |
| 5,589,743 A | 12/1996 | King |

(Continued)

FOREIGN PATENT DOCUMENTS

| CN | 1750375 A | 3/2006 |
| CN | 101254757 A1 | 9/2008 |

(Continued)

OTHER PUBLICATIONS

Schutten et al., "Characteristics of Load Resonant Converters Operated in a High-Power Factor Mode," IEEE Transactions on Power Electronics, vol. 7, No. 2, Apr. 1992, pp. 304-314.

(Continued)

*Primary Examiner* — Richard Isla Rodas
*Assistant Examiner* — Johali Torres Ruiz
(74) *Attorney, Agent, or Firm* — Meagher Emanuel Laks Goldberg & Liao, LLP (57) ABSTRACT

An apparatus for transferring energy using onboard power electronics with high-frequency transformer isolation includes a power electronic drive circuit comprises a dc bus and a first energy storage device coupled to the dc bus. A first bi-directional dc-to-ac voltage inverter is coupled to the first energy storage device and to the dc bus, and a first electromechanical device coupled to the first bi-directional dc-to-ac voltage inverter. A charging system coupled to the dc bus via a charge bus comprises a receptacle configured to mate with a connector coupled to a voltage source external to the power electronic drive circuit and an isolation transformer configured to electrically isolate the charge bus from the receptacle. A controller configured to cause the charging system to supply a charging voltage to the dc bus based on a voltage received from the voltage source external to the power electronic drive circuit.

23 Claims, 6 Drawing Sheets

(51) Int. Cl.
*B60L 3/00* (2006.01)
*B60L 7/14* (2006.01)
*B60L 11/12* (2006.01)
*B60L 11/18* (2006.01)

(52) U.S. Cl.
CPC .......... *Y02T 10/7072* (2013.01); *Y02T 10/7077* (2013.01); *Y02T 10/7225* (2013.01); *Y02T 10/7233* (2013.01); *Y02T 10/7241* (2013.01); *Y02T 90/127* (2013.01); *Y02T 90/14* (2013.01); *Y10T 29/49117* (2015.01)

(56) References Cited

U.S. PATENT DOCUMENTS

| | | | |
|---|---|---|---|
| 5,594,632 A * | 1/1997 | Barrett | H02M 1/15 363/44 |
| 5,903,449 A | 5/1999 | Garrigan et al. | |
| 5,929,595 A | 7/1999 | Lyons et al. | |
| 6,160,374 A * | 12/2000 | Hayes et al. | 320/108 |
| 6,331,365 B1 | 12/2001 | King | |
| 6,335,871 B1 | 1/2002 | Kita et al. | |
| 6,583,519 B2 * | 6/2003 | Aberle et al. | 307/10.1 |
| 6,724,100 B1 | 4/2004 | Gabriel | |
| 6,737,822 B2 | 5/2004 | King | |
| 7,049,792 B2 | 5/2006 | King | |
| 7,427,450 B2 | 9/2008 | Raiser | |
| 7,517,298 B2 | 4/2009 | Ortmann | |
| 7,559,388 B2 | 7/2009 | Severinsky et al. | |
| 7,932,633 B2 | 4/2011 | King et al. | |
| 2005/0151513 A1 * | 7/2005 | Cook et al. | 320/137 |
| 2008/0205109 A1 | 8/2008 | Darroman et al. | |
| 2009/0171523 A1 * | 7/2009 | Luo | B60K 6/405 701/22 |
| 2009/0309537 A1 * | 12/2009 | Saito | B60L 11/1811 320/101 |
| 2010/0063675 A1 * | 3/2010 | Soma et al. | 701/36 |
| 2010/0097031 A1 | 4/2010 | King et al. | |

FOREIGN PATENT DOCUMENTS

| | | |
|---|---|---|
| JP | 07-322524 A | 12/1995 |
| JP | 08-107683 A | 4/1996 |
| JP | 2010-104227 A | 5/2010 |
| JP | 2010-124536 A | 6/2010 |

OTHER PUBLICATIONS

Balogh, "The Current-Doubler Rectifier: An Alternative Rectification Technique for Push-Pull and Bridge Converters," Unitrode Corporation, Merrimack, NH, Dec. 1994, pp. 1-4.

Mappus, "Current Doubler Rectifier Offers Ripple Current Cancellation," Abstract, Texas Instruments, Dallas, TX, Sep. 2004, pp. 1-8.

* cited by examiner

APPARATUS FOR TRANSFERRING ENERGY USING ONBOARD POWER ELECTRONICS WITH HIGH-FREQUENCY TRANSFORMER ISOLATION AND METHOD OF MANUFACTURING SAME

BACKGROUND

The invention relates generally to electric drive systems including hybrid and electric vehicles and to stationary drives that are subject to transient or pulsed loads and, more particularly, to transferring energy between an electrical storage device of the vehicle or drive and a power source external to the vehicle.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the recharging of the fraction battery from the utility grid or other external source, for example. The battery charging circuitry, however, may include dedicated components such as boost converters, high-frequency filters, choppers, inductors, and other electrical components, including electrical connectors and contactors, dedicated only to transferring energy between the on-board electrical storage device and the external source. These additional dedicated components add extra cost and weight to the vehicle.

It would therefore be desirable to provide an apparatus to facilitate the transfer of electrical energy from an external source to the on-board electrical storage device of a plug-in vehicle that reduces the number of components dedicated only to transferring energy between the on-board electrical storage device and the external source. It would also be desirable to provide isolation of the on-board electrical storage device and other components of the plug-in vehicle from the external source.

BRIEF DESCRIPTION

According to one aspect of the invention, a power electronic drive circuit comprises a dc bus and a first energy storage device coupled to the dc bus, the first energy storage device configured to output a dc voltage. A first bi-directional dc-to-ac voltage inverter is coupled to the first energy storage device and to the dc bus, and a first electromechanical device coupled to the first bi-directional dc-to-ac voltage inverter. A charging system coupled to the dc bus via a charge bus comprises a receptacle configured to mate with a connector coupled to a voltage source external to the power electronic drive circuit and an isolation transformer configured to electrically isolate the charge bus from the receptacle. The power electronic drive circuit also comprises a controller configured to cause the charging system to supply a charging voltage to the dc bus based on a voltage received from the voltage source external to the power electronic drive circuit.

In accordance with another aspect of the invention, a method of manufacturing a power electronic drive circuit comprises coupling a first dc energy storage device to a dc bus, coupling a first bi-directional dc-to-ac voltage inverter to the dc bus, and coupling a first electromechanical device to the first bi-directional dc-to-ac voltage inverter, the first electromechanical device configured to convert mechanical energy into electrical energy and configured to convert electrical energy into mechanical energy. The method also comprises coupling a charging circuit to the dc bus via a charge bus, the charging system comprising a receptacle configured to mate with an external voltage source connector and a transformer configured to electrically isolate the charge bus from the receptacle. The method also comprises configuring a controller to cause the charging system to supply a charging voltage to the dc bus based on a voltage received from an external voltage source.

In accordance with yet another aspect of the invention, a system comprises a machine and a voltage inverter coupled to the machine. The machine is configured to convert mechanical energy into electrical energy and configured to convert electrical energy into mechanical energy. The voltage inverter is configured to convert ac electrical energy into dc electrical energy and to convert dc electrical energy into ac electrical energy. The system also comprises a dc bus coupled to the voltage inverter, a first energy storage device coupled to the dc bus, and a charging system. The charging system comprises a receptacle, a full-wave rectifier coupled to the receptacle, a dc-to-dc converter coupled to the full-wave rectifier, and a charge bus coupled to the dc-to-dc converter and to the dc bus. The receptacle is configured to mate with a plug coupled to a voltage source external to the power electronic drive circuit. The full-wave rectifier is configured to rectify a voltage received from the voltage source. The dc-to-dc converter comprises an isolation transformer configured to electrically isolate the charge bus from the full-wave rectifier. The system also comprises a controller configured to cause the dc-to-dc converter to convert a first dc voltage received from the full-wave rectifier to a second dc voltage and to supply the second dc voltage to the charge bus.

Various other features and advantages will be made apparent from the following detailed description and the drawings.

BRIEF DESCRIPTION OF THE DRAWINGS

The drawings illustrate embodiments presently contemplated for carrying out one or more embodiments of the invention.

In the drawings.

DETAILED DESCRIPTION

Figure 1:
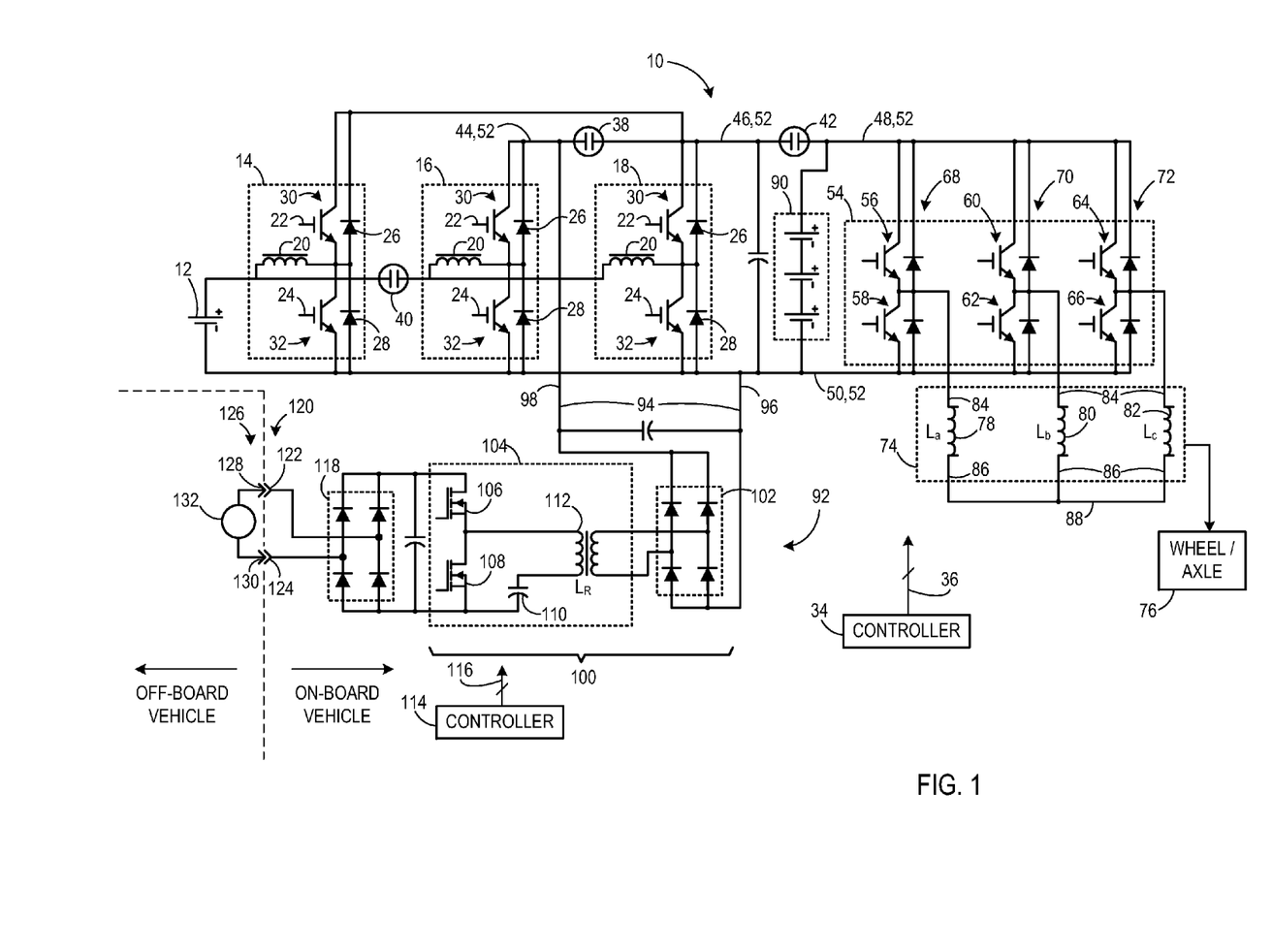
FIG. 1 is a schematic diagram of a traction system according to an embodiment of the invention.

FIG. 1 is a schematic diagram of a traction system 10 usable in a vehicle, such as a plug-in electric or plug-in hybrid vehicle, or stationary electric drive system according to an embodiment of the invention. Traction system 10 includes a first energy storage device 12. In one embodiment, first energy storage device 12 is a low-voltage energy storage device and may be a battery, a fuel cell, an ultracapacitor, or the like. Traction system 10 includes a first, second, and third bi-directional dc-to-dc voltage converter 14, 16, 18 configured to convert one dc voltage into another dc voltage. First energy storage device 12 is coupled to bi-directional dc-to-dc voltage converters 14-18. Each bi-directional dc-to-dc voltage converter 14-18 includes an inductor 20 coupled to a pair of switches 22, 24 and coupled to a pair of diodes 26, 28. Each switch 22, 24 is coupled to a respective diode 26, 28, and each switch/diode pair forms a respective half phase module 30, 32. Switches 22, 24 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs). Semiconductor electronic switch fabrication may include silicon, silicon-carbide, or other semiconductor material technology.

Traction system 10 includes a controller 34 coupled to switches 22, 24 via a respective pair of lines 36. A plurality of contactors 38, 40, 42 form a coupling assembly controlled by controller 34 during an operating and/or internal charging mode and during an external charging mode of traction system 10. During the operating mode, controller 34 is configured to cause contactors 38-42 to switch to or to remain in a closed position. Through appropriate control of switches 22 and 24 during the operating mode, controller 34 is configured to control bi-directional dc-to-dc voltage converters 14-18 to boost a voltage of first energy storage device 12 to a higher voltage and to supply the higher voltage to a plurality of conductors 44, 46, 48, 50 of a dc bus 52 coupled to bi-directional dc-to-dc voltage converters 14-18. During the internal charging mode, controller 34 is also configured to cause contactors 38-42 to switch to or to remain in a closed position and to control switches 22 and 24 of bi-directional dc-to-dc voltage converters 14-18 to buck a voltage from the dc bus 52 for supply of the bucked voltage to first energy storage device 12 for charging first energy storage device 12.

Traction system 10 includes a bi-directional dc-to-ac voltage inverter 54 coupled to dc bus 52. Bi-directional dc-to-ac voltage inverter 54 includes six half phase modules 56, 58, 60, 62, 64, and 66 that are paired to form three phases 68, 70, and 72. Each phase 68, 70, 72 is coupled to conductors 48 and 50 of dc bus 52. An electromechanical device or machine 74 is coupled to bi-directional dc-to-ac voltage inverter 54. In one embodiment, electromechanical device 74 is shown as a three-phase traction motor mechanically coupled to one or more driving wheels or axles 76 of a vehicle (not shown). Alternate electromechanical device configurations (not shown) include multiple phases other than three. Electromechanical device 74 includes a plurality of windings 78, 80, and 82 having a plurality of conductors 84 coupled to respective phases 68, 70, 72 of bi-directional dc-to-ac voltage inverter 54. Windings 78-82 also have a plurality of conductors 86 coupled together to form a common node 88. Alternate electromechanical device 74 configurations (not shown) include a plurality of windings that are coupled in a "delta" configuration without a common node 88.

Controller 34 is coupled to half phase modules 56-66 via respective lines 36. Controller 34, through appropriate control of half phase modules 56-66, is configured to control bi-directional dc-to-ac voltage inverter 54 to convert a dc voltage or current on dc bus 52 to an ac voltage or current for supply to windings 78-82 via conductors 84. Accordingly, the dc voltage or current from first energy storage device 12 may be boosted via bi-directional dc-to-dc voltage converters 14-18 to a higher dc voltage or current that is then converted into an ac voltage or current and delivered to motor 74 to drive wheels 76. In other non-vehicle propulsion systems, the drive wheels 76 may be a pulsed load (not shown), including a pump, fan, winch, crane, or other motor driven loads. In a regenerative braking mode, electromechanical device 74 may be operated as a generator to brake wheels 76 and to supply ac voltage or current to bi-directional dc-to-ac voltage inverter 54 for inversion into a dc voltage or current onto dc bus 52. Thereafter, the dc voltage or current may be bucked or converted into another dc voltage or current via bi-directional dc-to-dc voltage converters 14-18 that is suitable for recharging first energy storage device 12.

Traction system 10 also includes a second energy storage device 90 coupled to dc bus 52 to provide additional power to drive wheels 76. Second energy storage device 90 may be configured to provide a higher power than first energy storage device 12 to provide power during, for example, acceleration periods of the vehicle. First energy storage device 12 may be configured to provide a higher energy than second energy storage device 90 to provide a longer-lasting power to the vehicle to increase a travelling distance thereof. Energy supplied via second energy storage device 90 to dc bus 52 may also be inverted via bi-directional dc-to-ac voltage inverter 54 and supplied to motor electromechanical device 74. Similarly, energy generated during a regenerative braking mode may also be used to recharge second energy storage device 90 via bi-directional dc-to-ac voltage inverter 54.

When a vehicle incorporating traction system 10 is parked or not in use, it may be desirable to plug the vehicle into, for example, the utility grid or to a renewable energy source to refresh or recharge either or both of the energy storage devices 12, 90. Accordingly, FIG. 1 shows an embodiment of the invention including a charging circuit or system 92 coupled to traction system 10 for the recharging of energy storage devices 12, 90 such that components of traction system 10 may be used for the dual purposes of recharging energy storage devices 12, 90 and converting energy from energy storage devices 12, 90 into energy usable to propel the vehicle.

Charging system 92 includes a charging bus 94 having a pair of conductors 96, 98. As shown in FIG. 1, conductor 96 is coupled to conductor 50 of dc bus 52, and conductor 98 is coupled to conductor 44 of dc bus 52. Charging system 92 has an isolation dc-to-dc converter 100 coupled to charging bus 94 that includes a full-wave rectifier 102 and an inverter 104 operated, in this embodiment, as a series resonant inverter. Inverter 104 is configured to convert a dc voltage into an ac voltage and to deliver the ac voltage to rectifier 102 for rectification into another dc voltage to be supplied to charging bus 94 for charging first and/or second energy storage devices 12, 90.

Inverter 104 includes a pair of switches or transistors 106, 108 coupled to a resonance capacitor 110 and to a transformer 112. According to embodiments of the invention, transistors 106, 108 are field-effect transistors, and transformer 112 is a small, high-frequency transformer. A controller 114 coupled to transistors 106, 108 via respective lines 116 is configured to independently control transistors 106, 108 in a series resonance mode such that the resonance capacitor 110 and transformer leakage inductance ($L_R$) of transformer 112 operate substantially at or slightly above resonance in open loop. The transformer leakage inductance, which serves as a resonant inductor is not shown in the figure. While traction system 10 is shown in FIG. 1 as having two controllers 34, 114, it is contemplated that more or less than two controllers may be configured to perform the controller operations.

Since the resonant inductance ($L_R$) is provided by transformer 112, an additional component is avoided. Also, since a low value of leakage inductance is not needed, the spacing between the primary and secondary windings of transformer 112 can be relatively large, which leads to low inter-winding capacitance (which in turn leads to good EMI performance). This large spacing also achieves excellent high-voltage isolation between the input side and the output side of dc-to-dc converter 100. In addition, the turns ratio of transformer 112 can be designed or selected such that an optimum voltage is generated therefrom based on the characteristics of the voltage input into dc-to-dc converter 100. In one embodiment, the magnetizing inductance of transformer 112 is designed to provide soft switching at any load.

Control of transistors 106, 108 in this manner allows for low switching losses and for a simple constant-frequency control. Transistors 106, 108 may, for example, both be operated at a frequency such as 100 KHz based on an appropriate matching of the characteristics of resonance capacitor 110 and transformer 112. By running at or just above resonance, the high-frequency current that is carried by the high-frequency switches or transistors 106, 108 is sinusoidal, and switching occurs at near zero current. In this manner, switching loses are near zero. In addition, the magnetizing inductance of transformer 112 can be designed to produce just enough magnetizing current to allow zero-voltage switching (ZVS) of transistors 106, 108 that will be independent of the load current. Accordingly, efficient switching allowing for high-frequency operation (e.g., 100 to 300 kHz typically) is achieved.

Charging system 92 includes a full-wave rectifier 118 coupled to dc-to-dc converter 100 and coupled to a receptacle 120 having contacts 122, 124 configured to mate with a plug or connector 126 having contacts 128, 130 of an external power source 132. In one embodiment, it is contemplated that external power source 132 is an ac source and that one, two, or three phases of external power source 132 may be used and that external power source 132 may provide, for example, 120 Vac or 240 Vac power. In a configuration designed for operation from a three phase ac external power source 132, rectifier 118 may be modified to include two additional diodes (not shown) for the third phase of a three-phase rectifier. According to another embodiment of the invention, it is contemplated that external power source 132 is a dc source. Coupling dc source 132 to charging bus 94 through rectifier 118 helps to ensure that the charging voltage transferred to charging bus 94 has the correct polarity if dc source 132 is coupled to rectifier 118 with a reverse polarity. Receptacle 120 may be used with either an external ac voltage source or an external dc voltages source. Having a single receptacle 120 configured to mate with either type of external voltage source helps to reduce costs for the system.

The power factor of an ac electric power system is defined as the ratio of the real power to the apparent power and may be expressed as a number between 0 and 1 or as a percentage between 0 and 100. Real power is the capacity of the circuit for performing work in a particular time. Apparent power is the product of the rms current and rms voltage of the circuit. Due to energy stored in the load and returned to the source, or due to a non-linear load that distorts the wave shape of the current drawn from the source, the apparent power can be greater than the real power. A circuit with a lower power factor performs less work for the same rms voltage and current than a circuit with a higher power factor. Therefore, to perform the same amount of work, a higher voltage or current is input into the circuit with the lower power factor.

Switch-mode power supplies may be configured to control the amount of power drawn by a load to increase the energy transfer power factor. In some applications, a switch-mode power supply, such as one including a buck/boost converter for example, controls the input current thereto so that the current waveform is proportional to the input voltage waveform thereto. For example, the buck/boost converter may shape the current waveform into a sine wave that is in phase with a sine wave of the voltage waveform. The boost converter can be controlled to maintain a constant dc bus output line voltage while drawing a current that is in phase with, and at the same frequency as, the output line voltage.

When a vehicle incorporating traction system 10 is parked or not in use, it may be desirable to plug the vehicle into, for example, the utility grid or to a renewable energy source to refresh or recharge either or both of the energy storage devices 12, 90. Accordingly, operation of traction system 10 during the external charging mode will now be described.

When external power source 132 is connected to charging system 92 through contacts 122, 124, 128, 130, controller 114 is configured to control dc-to-dc converter 100 as described above to provide a charging voltage to charging bus 94, which transfers the charging voltage to dc bus 52.

In a bucking-only charging mode, controller 34 is configured to control contactors 38-42 to switch to or to remain in an open position to de-couple bi-directional dc-to-dc voltage converter 16 from conductor 46 of dc bus 52 and to de-couple bi-directional dc-to-dc voltage converters 16, 18 from being directly coupled to first energy storage device 12. In addition, second energy storage device 90 is de-coupled from the charging voltage. Controller 34 is also configured to control bi-directional dc-to-dc voltage converter 16 in a bucking mode to convert the dc charging voltage supplied by charging bus 94 to a lower, second charging voltage. To buck the charging voltage, controller 34 controls switch 22 such that, together with inductor 20 and diode 28 of converter 16, the second charging voltage is supplied to bi-directional dc-to-dc voltage converter 18. Diode 26 of converter 18 supplies the second charging voltage to bi-directional dc-to-dc voltage converter 14, which supplies the second charging voltage to first energy storage device 12 via inductor 20 and switch 22 (which is controlled to an on state) of converter 14.

In a boost-buck charging mode, controller 34 is configured to control contactors 38-40 to switch to or to remain in an open position. Controller 34 is also configured to control switch 22 to an on state such that converter 16 transfers the charging voltage to converter 18 without active bucking control. Controller 34 is configured to control converter 18 in a boosting mode to convert the dc charging voltage supplied by charging bus 94 to a higher, second charging voltage. To boost the charging voltage, controller 34 controls switch 22 such that, together with diode 28 of converter 18, the second charging voltage is supplied to bi-directional dc-to-dc voltage converter 14. In one embodiment, controller 34 may control contactor 42 to a closed state such that the second charging voltage is also supplied to second energy storage device 90 for a charging thereof. Controller 34 is configured to control bi-directional dc-to-dc voltage converter 14 in a bucking mode to convert the boosted dc charging voltage supplied by converter 18 to a lower, third charging voltage. To buck the charging voltage, controller 34 controls switch 22 such that, together with inductor 20 and diode 28 of converter 14, the third charging voltage is supplied to first energy storage device 12.

With contactor 38 open and contactor 42 closed, bidirectional power converters 16 and 18 can be used in combination to produce bucking or boosting to charge energy storage device 90. When the voltage bus 94 is below voltage bus 52, voltage boosting is accomplished by turning on transistor 22 of bidirectional converter 16 and operating transistor 24 and diode 26 of bi-directional converter 18 in a switching mode to boost the voltage up to the level of bus 52 to charge energy storage device 90. If the voltage bus 94 exceeds voltage bus 52, the same converters can be operated in a bucking mode by operating transistor 22 and diode 28 of bi-directional converter 16 in a bucking mode and continuously conducting current through diode 26 of bi-directional converter 18 to bus 52 thus charging energy storage device 90. In this manner energy storage device 90 can be charged whether or not voltage bus 94 is above or below voltage bus 52. It is noted that the bucking and boosting modes can be alternated rapidly during a half cycle of the input ac voltage wave (typically 50 or 60 Hz). With dc-dc converter 100 operated at a constant frequency, its output voltage bus 94 will pulsate at double line frequency (typically 100 or 120 Hz). When bus 94 voltage is low (around the zero crossings of the input ac voltage 132) the converters act in the boosting mode and near the maximum of the ac input wave of ac voltage 132, the converters can act in the bucking mode if this voltage exceeds the voltage of bus 52. With proper control by controller 34, the input current value can be made to be proportional to the input voltage wave thus obtaining high power factor. With this type of control of bi-directional converters 16 and 18, the average load at the output of dc-dc converter 100 looks like a resistor and this is reflected to the ac input source as an equivalent resistor as well. Thus, high power factor is achieved with low harmonic currents. This same type of behavior can be achieved with the embodiments to follow (except embodiment in FIG. 3 which will be discussed below).

Another embodiment of the invention includes a traction system 134 generally illustrated in FIG. 2, where similar components discussed in connection with the embodiment shown in FIG. 1 have been designated with similar reference numerals.

Figure 2:
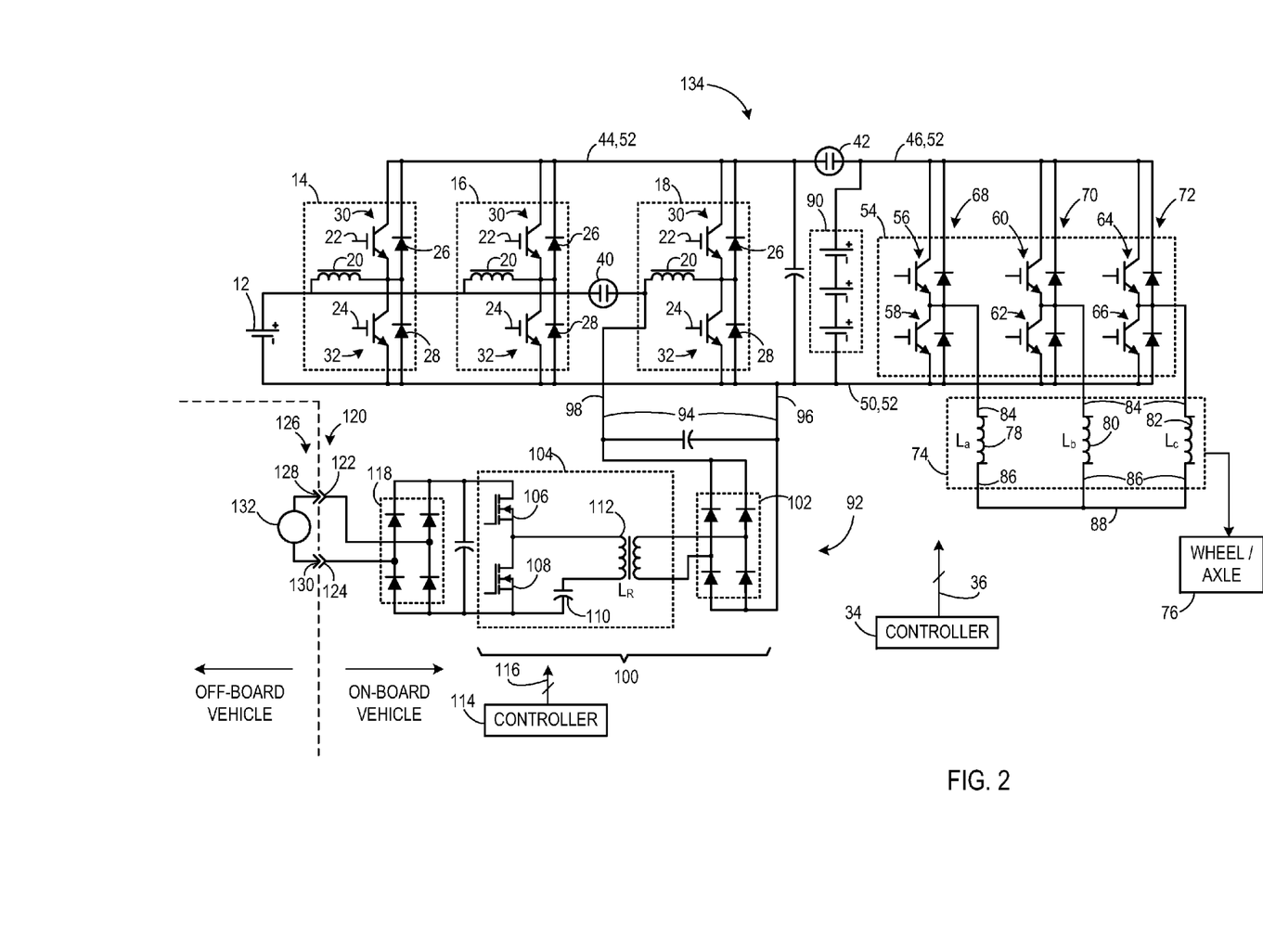
FIG. 2 is a schematic diagram of another traction system according to an embodiment of the invention.

As shown in FIG. 2, conductor 98 of charging bus 94 is directly coupled to inductor 20 of bi-directional dc-to-dc voltage converter 18 rather than to conductor 44 of dc bus 52. In addition, contactor 38 is removed, and contactor 40 is coupled between converters 14, 16 and converter 18.

In a bucking-only charging mode, controller 34 is configured to control contactors 40-42 to switch to or to remain in an open position to de-couple bi-directional dc-to-dc voltage converter 18 from being directly coupled to first energy storage device 12 and to converters 14, 16. In addition, second energy storage device 90 is de-coupled from the charging voltage. Via diode 26 of converter 18, the charging voltage supplied by charging bus 94 is supplied to dc bus 52. Controller 34 is configured to control either or both converters 14, 16 in a bucking mode to convert the dc charging voltage on dc bus 52 to a lower, second charging voltage. To buck the charging voltage, controller 34 controls switch 22 such that, together with inductor 20 and diode 28 of either or both converters 14, 16, the second charging voltage is supplied to first energy storage device 12.

In a boost-buck charging mode, controller 34 is configured to control contactor 40 to switch to or to remain in an open position. Controller 34 is also configured to control converter 18 in a boosting mode to convert the dc charging voltage supplied by charging bus 94 to a higher, second charging voltage. To boost the charging voltage, controller 34 controls switch 24 such that, together with diode 26 of converter 18, the second charging voltage is supplied to bi-directional dc-to-dc voltage converters 14, 16. In one embodiment, controller 34 may control contactor 42 to a closed state such that the second charging voltage is also supplied to second energy storage device 90 for a charging thereof. Controller 34 is configured to control either or both of bi-directional dc-to-dc voltage converters 14, 16 in a bucking mode to convert the boosted dc charging voltage supplied by converter 18 to a lower, third charging voltage. To buck the charging voltage, controller 34 controls switch 22 such that, together with inductor 20 and diode 28 of either or both converters 14, 16, the third charging voltage is supplied to first energy storage device 12.

Another embodiment of the invention includes a traction system 136 generally illustrated in FIG. 3, where similar components discussed in connection with the embodiments shown in FIGS. 1 and 2 have been designated with similar reference numerals.

In one embodiment, inverter 104 is operated in a parallel resonance mode or in a series-parallel resonance mode to draw sinusoidal utility current. Operation of inverter 104 in this manner includes an active control of inverter 104 using received current feedback and moving the frequency of controlling transistors 106, 108 around to control the input current wave shape. It is contemplated, however, that control of inverter 104 in a series resonance mode as described above is also available.

Figure 3:
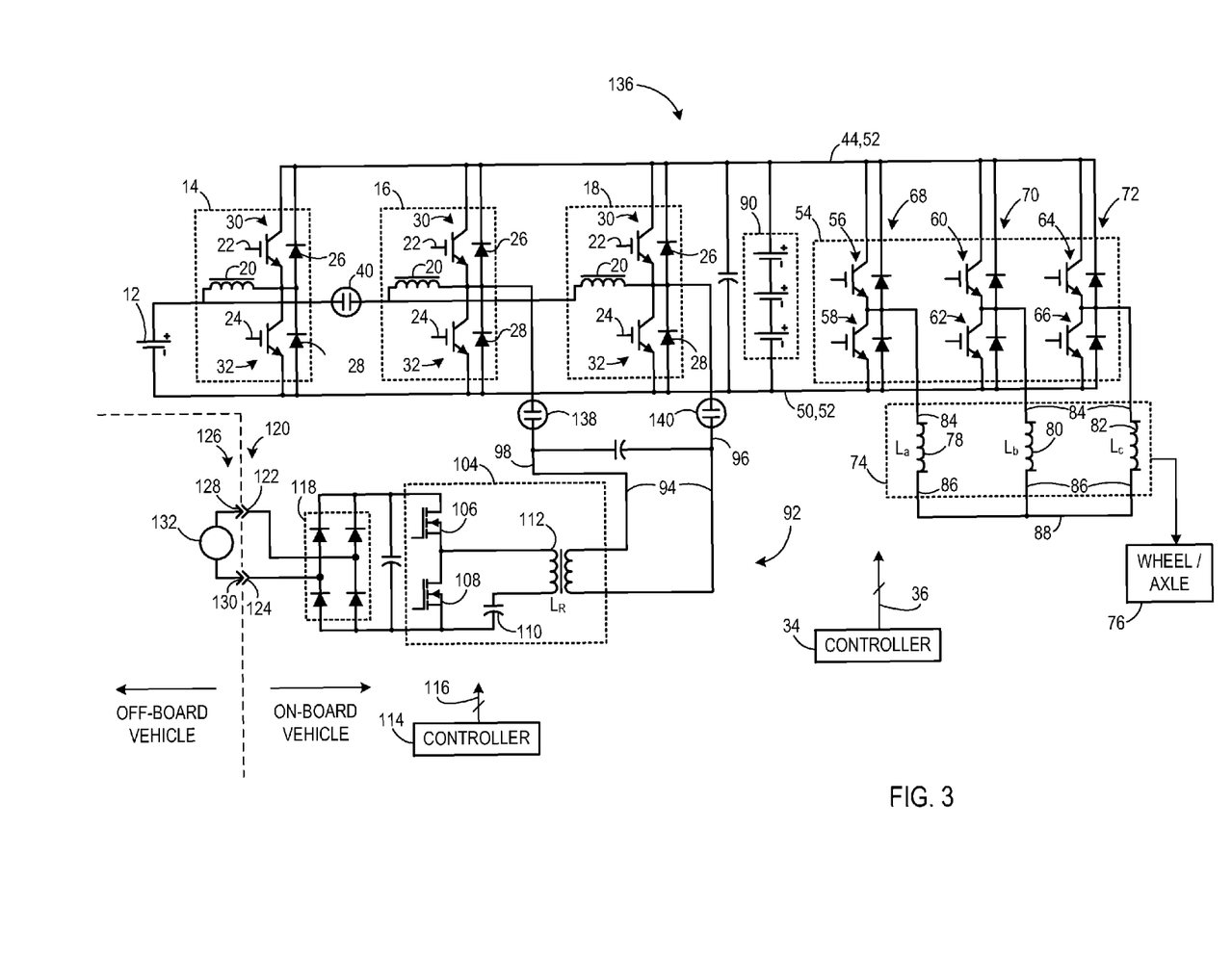
FIG. 3 is a schematic diagram of another traction system according to an embodiment of the invention.

As shown in FIG. 3, conductor 98 of charging bus 94 is directly coupled to diodes 26, 28 of bi-directional dc-to-dc voltage converter 16, and conductor 96 of charging bus 94 is directly coupled to diodes 26, 28 of bi-directional dc-to-dc voltage converter 18 rather than to conductor 44 of dc bus 52. In this manner, rectifier 102 illustrated in FIGS. 1 and 2 is not needed, and the rectification of the ac voltage output from charging system 92 is rectified via diodes 26, 28 of converters 16, 18.

In a boost-buck charging mode via charging circuit or system 92, controller 114 is configured to close a pair of contactors 138, 140 coupled to conductors 96, 98 of charging bus 94 and to open contactor 40 so that uncontrollable dc current does not flow from inductors 20 of bi-directional dc-to-dc voltage converters 16 and 18 directly to energy storage device 12. Controller 114 is also configured to control inverter 104 to invert and boost the voltage from rectifier 118 and to supply the boosted voltage to diodes 26, 28 of converters 16, 18 for rectification into a boosted dc voltage for supplying dc bus 52. Second energy storage device 90 is recharged via the boosted dc voltage. Controller 34 is configured to bi-directional dc-to-dc voltage converter 14 in a bucking mode to convert the boosted dc charging voltage supplied to the dc bus 52 to a lower charging voltage. To buck the charging voltage, controller 34 controls switch 22 such that, together with inductor 20 and diode 28 of converter 14, the charging voltage is supplied to first energy storage device 12.

When operating in a non-external charging mode such as during a regenerative braking mode, controller 114 is configured to open one or both of contactors 138, 140 if converters 16, 18 are to be operated differently. Opening one or both of contactors 138, 140 helps prevent potential current flow in transformer 112 when the system is operating in the non-external charging mode. One skilled in the art will also recognize that if converters 16 and 18 are switched together while operating in a non-external charging or motoring mode, for example while motoring or propelling the vehicle, contactors 138, 140 would not needed since there would be no voltage across the secondary winding of transformer 112.

Another embodiment of the invention includes a traction system 142 generally illustrated in FIG. 4, where similar components discussed in connection with the embodiments shown in FIGS. 1-3 have been designated with similar reference numerals.

Traction system 142 includes a second bi-directional dc-to-ac voltage inverter 144 coupled to a second electromechanical device 146, which includes a plurality of windings 148, 150, and 152. Second bi-directional dc-to-ac voltage inverter 144 includes six half phase modules 154, 156, 158, 160, 162 and 164 that are paired to form three phases 166, 168, and 170. Each phase 166, 168, 170 is coupled to conductors 44 and 50 of dc bus 52.

In an embodiment of the invention, electromechanical device 74 is a traction motor coupled to wheels 76, and electromechanical device 146 is an alternator mechanically coupled to an internal combustion engine 172. Controller 34 is coupled to half phase modules 154-164 via respective lines 36. Controller 34, through appropriate control of half phase modules 154-164, is configured to control cranking inverter 144 to convert a dc voltage or current on dc bus 52 to an ac voltage or current for supply to windings 148-152 of alternator 146 to produce torque to crank internal combustion engine 172. Alternatively, internal combustion engine 172 may apply torque to alternator 146 to supply ac voltage or current to cranking inverter 144 for inversion into a dc voltage or current onto dc bus 52. Thereafter, the dc voltage or current recharges second energy storage device 90 and/or may be bucked or converted into another dc voltage via bi-directional dc-to-dc voltage converter 14 that is suitable for recharging first energy storage device 12.

Figure 4:
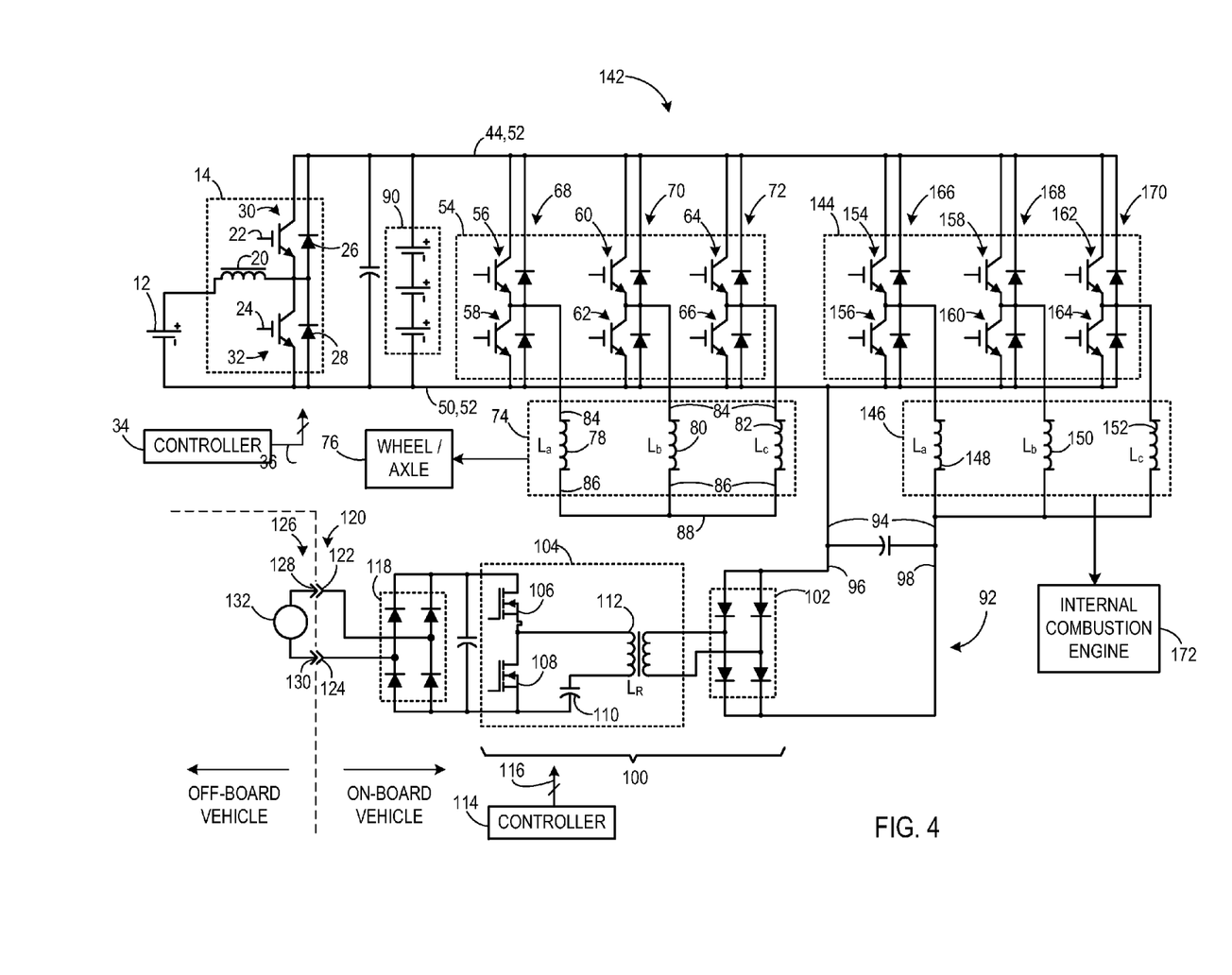
FIG. 4 is a schematic diagram of another traction system according to an embodiment of the invention.

As shown in FIG. 4, charging system 92 is coupled to alternator 146. Accordingly, in a boost-buck charging mode, controller 34 is configured to control, for example, half phase modules 154, 156 of phase 166 to boost charging voltage or current flowing into winding 148 of alternator 146. The boosted charging voltage is supplied to dc bus 52 and is used to directly recharge second energy storage device 90, if present, and to recharge first energy storage device 12 via bucking control of bi-directional dc-to-dc voltage converter 14 by controller 34. If second energy storage device 90 is not present, a dc Link filter capacitor (not shown) contained within the inverter 144 provides the smoothing function for the dc bus 52, and recharge of the first energy storage device 12 can be charged via bucking control of bi-directional dc-to-dc voltage converter 14 by controller 34. Accordingly, a high power factor may be realized for configurations where a dc voltage level on dc bus 52 is higher than the peak voltage of rectifier 118 output. Controller 34 may also be configured to additionally control half phase modules 158, 160 of phase 168 and/or half phase modules 162, 164 of phase 170 to operate cranking inverter 144 as a two- or three-phase boost circuit in an interleaving mode during charging to reduce ripple. Further, the one-, two-, or three-phase operation during charging may maximize part-load charging efficiency.

Figure 5:
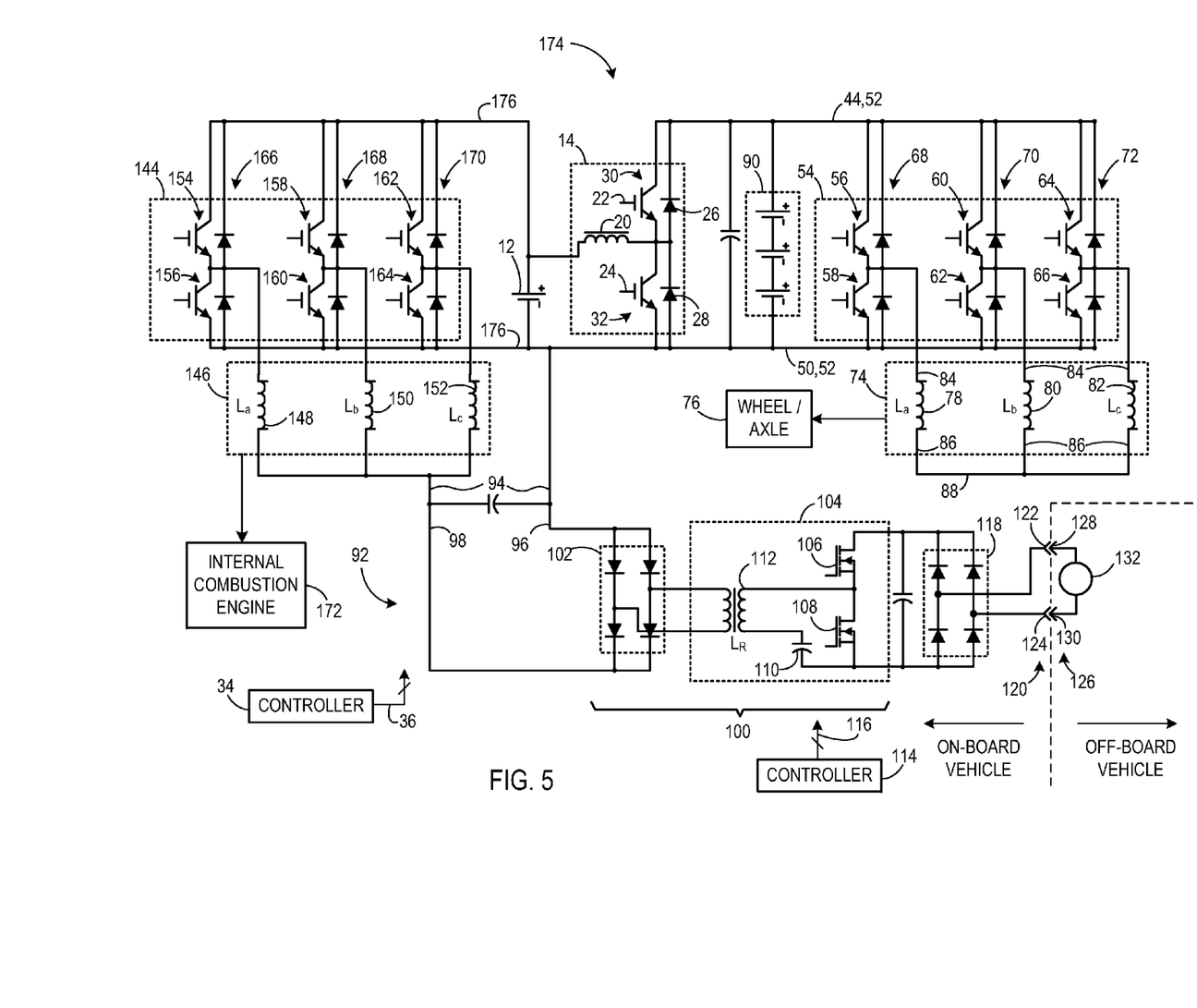
FIG. 5 is a schematic diagram of another traction system according to an embodiment of the invention.

Furthermore, while bi-directional dc-to-dc voltage converters 16, 18 are not illustrated in FIG. 4, it is to be understood that traction system 142 may include converters 16, 18 and that converter 16 and/or 18 may be operated in addition to converter 14 to provide a two- or three-phase buck circuit in an interleaving mode FIG. 5 shows a schematic diagram of a traction system 174 according to another embodiment of the invention, where similar components discussed in connection with the embodiments shown in FIGS. 1-4 have been designated with similar reference numerals. Traction system 174 includes first and second bi-directional dc-to-ac voltage inverters 54, 144 and electromechanical devices 74, 146 similar to traction system 142 of FIG. 4. However, bi-directional dc-to-ac voltage inverter 144 shown in FIG. 5 is coupled in parallel to first energy storage device 12 across a second dc bus 176 rather than in parallel to bi-directional dc-to-ac voltage inverter 54 across dc bus 52 as shown in FIG. 4. Accordingly, a charging voltage from external power source 132 is boosted through bi-directional dc-to-ac voltage inverter 144 via appropriate control via controller 34. The boosted charging voltage directly recharges first energy storage device 12 and recharges second energy storage device 90, if present, via boosting control of bi-directional dc-to-dc voltage converter 14. Controller 34 may also be configured to additionally control half phase modules 158, 160 of phase 168 and/or half phase modules 162, 164 of phase 170 to operate cranking inverter 144 as a two- or three-phase boost circuit in an interleaving mode during charging to reduce ripple. Further, the one-, two-, or three-phase operation during charging may maximize part-load charging efficiency. Controller 34 may also be configured to additionally control half phase modules 154, 156 of phase 166, half phase modules 158, 160 of phase 168, and half phase modules 162, 164 of phase 170 to operate cranking inverter 144 as a ac-dc converter to provide a controlled charge voltage to energy storage device 12 and power to operate traction drive system comprised of dc to ac inverter 54 and electrical machine 74 using power form internal combustion engine 172 driving alternator 146.

Figure 6:
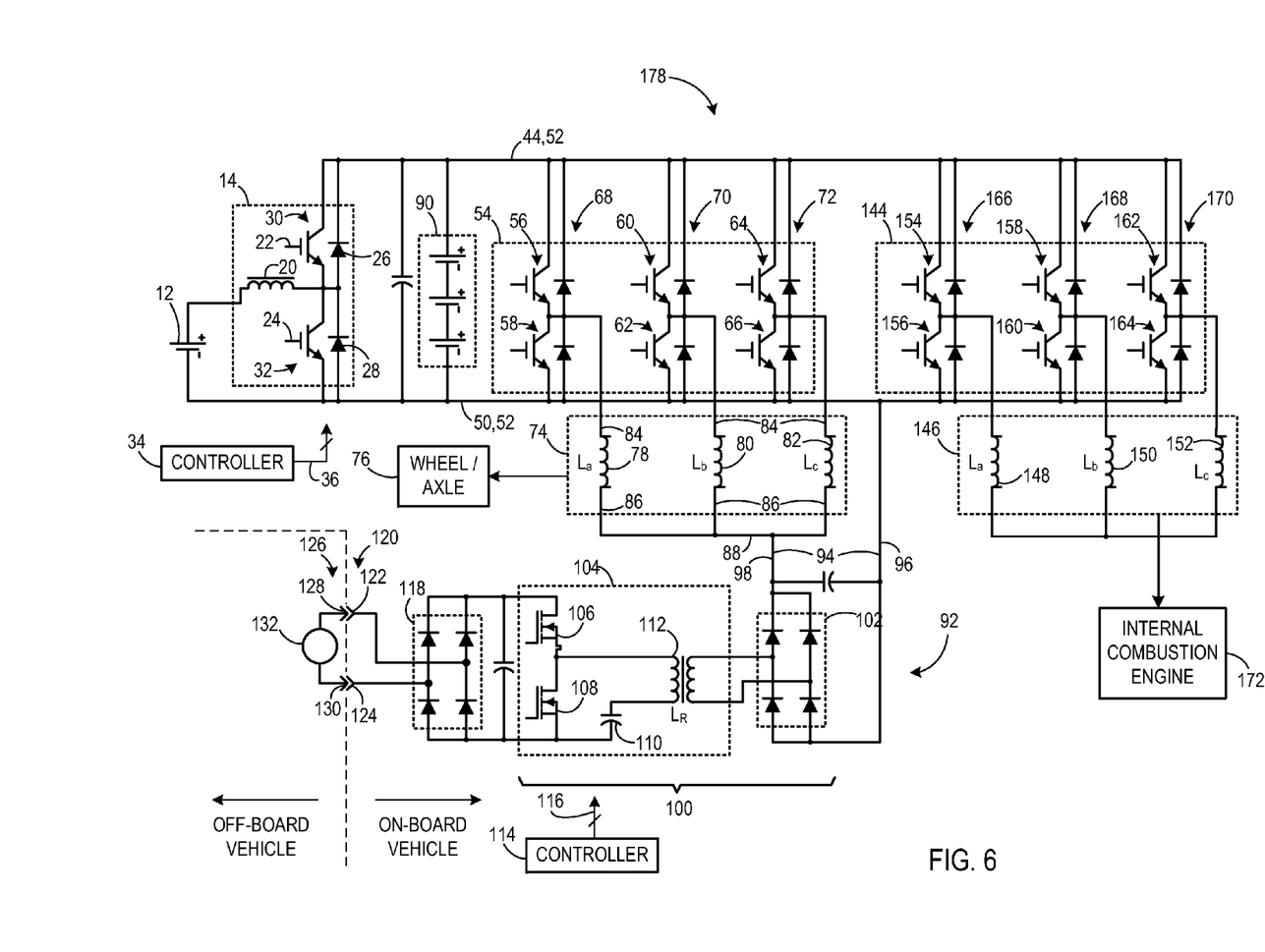
FIG. 6 is a schematic diagram of another traction system according to an embodiment of the invention.

Another embodiment of the invention includes a traction system 178 generally illustrated in FIG. 6, where similar components discussed in connection with the embodiments shown in FIGS. 1-5 have been designated with similar reference numerals.

Traction system 178, similar to traction system 142 of FIG. 4, has conductor 98 of charging bus 94 coupled to an electromechanical device. However, conductor 98 of traction system 178 shown in FIG. 6 is directly coupled to node 88 of traction motor 74 rather than to alternator 146. In the boost-buck charging mode, controller 34 is configured to control, for example, half phase modules 56, 58 of phase 68 to boost charging voltage and thus current flowing into winding 78 of motor 74. The boosted charging voltage is supplied to dc bus 52 and is used to directly recharge second energy storage device 90, if present, and to recharge first energy storage device 12 via bucking control of bi-directional dc-to-dc voltage converter 14 by controller 34.

Embodiments of the invention thus use on-board converters, dc-dc converters and associated inductors, inverters, machine inductances of a traction control system, or a combination thereof to recharge one or more energy storage devices of the traction control system. In this manner, the converters, inverters, dc-dc converter associated inductors, and machine inductances may be used for the dual purposes of motoring and recharging the energy storage devices. Using the inverters, dc-dc converter associated inductors, and machine inductances allows for high-power factor, low harmonic charging of the energy storage devices. In addition, using a dc-to-dc converter in the charging system that has an isolation transformer allows the on-board converters, inverters, and machine inductances to be isolated from the mains. Accordingly, a protection against ground faults and the like is improved. Also, the charging voltage fed to the converters, inverters, dc-dc converter associated inductors, and machine inductances may be designed to be at an optimal level.

According to one embodiment of the invention, a power electronic drive circuit comprises a dc bus and a first energy storage device coupled to the dc bus, the first energy storage device configured to output a dc voltage. A first bi-directional dc-to-ac voltage inverter is coupled to the first energy storage device and to the dc bus, and a first electromechanical device coupled to the first bi-directional dc-to-ac voltage inverter. A charging system coupled to the dc bus via a charge bus comprises a receptacle configured to mate with a connector coupled to a voltage source external to the power electronic drive circuit and an isolation transformer configured to electrically isolate the charge bus from the receptacle. The power electronic drive circuit also comprises a controller configured to cause the charging system to supply a charging voltage to the dc bus based on a voltage received from the voltage source external to the power electronic drive circuit.

In accordance with another embodiment of the invention, a method of manufacturing a power electronic drive circuit comprises coupling a first dc energy storage device to a dc bus, coupling a first bi-directional dc-to-ac voltage inverter to the dc bus, and coupling a first electromechanical device to the first bi-directional dc-to-ac voltage inverter, the first electromechanical device configured to convert mechanical energy into electrical energy and configured to convert electrical energy into mechanical energy. The method also comprises coupling a charging circuit to the dc bus via a charge bus, the charging system comprising a receptacle configured to mate with an external voltage source connector and a transformer configured to electrically isolate the charge bus from the receptacle. The method also comprises configuring a controller to cause the charging system to supply a charging voltage to the dc bus based on a voltage received from an external voltage source.

In accordance with yet another embodiment of the invention, a system comprises a machine and a voltage inverter coupled to the machine. The machine is configured to convert mechanical energy into electrical energy and configured to convert electrical energy into mechanical energy. The voltage inverter is configured to convert ac electrical energy into dc electrical energy and to convert dc electrical energy into ac electrical energy. The system also comprises a dc bus coupled to the voltage inverter, a first energy storage device coupled to the dc bus, and a charging system. The charging system comprises a receptacle, a full-wave rectifier coupled to the receptacle, a dc-to-dc converter coupled to the full-wave rectifier, and a charge bus coupled to the dc-to-dc converter and to the dc bus. The receptacle is configured to mate with a plug coupled to a voltage source external to the power electronic drive circuit. The full-wave rectifier is configured to rectify a voltage received from the voltage source. The dc-to-dc converter comprises an isolation transformer configured to electrically isolate the charge bus from the full-wave rectifier. The system also comprises a controller configured to cause the dc-to-dc converter to convert a first dc voltage received from the full-wave rectifier to a second dc voltage and to supply the second dc voltage to the charge bus.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A power electronic drive circuit comprising:
   a dc bus;
   a first energy storage device coupled to the dc bus, the first energy storage device configured to output a dc voltage;
   a first bi-directional dc-to-ac voltage inverter coupled to the first energy storage device and to the dc bus;
   a first electromechanical device coupled to the first bi-directional dc-to-ac voltage inverter;
   a charging system coupled to the dc bus via a charge bus, the charging system comprising:
      a receptacle configured to mate with a connector coupled to a voltage source external to the power electronic drive circuit; and
      an isolation transformer configured to electrically isolate the charge bus from the receptacle;
   a controller configured to cause the charging system to supply a charging voltage to the dc bus based on a voltage received from the voltage source external to the power electronic drive circuit; and
   one or more bi-directional dc-to-dc voltage converters coupled to the dc bus;
   wherein the controller is further configured to cause one of the first bi-directional dc-to-ac inverter and the one or more bi-directional dc-to-dc voltage converters to:
      buck the charging voltage to a second charging voltage and supply the second charging voltage to the dc bus, when a voltage of the charge bus is above a voltage of the dc bus; and
      boost the charging voltage to a third charging voltage and supply the third charging voltage to the dc bus, when the voltage of the charge bus is below the voltage of the dc bus; and
   wherein, upon boosting the charging voltage, the controller is further configured to cause a first bi-directional dc-to-dc voltage converter of the one or more bi-directional dc-to-dc voltage converters to buck the third charging voltage to a fourth charging voltage and supply the fourth charging voltage to the first energy storage device.

2. The power electronic drive circuit of claim 1 wherein the charging system further comprises:
   a pair of transistors; and
   a resonance capacitor; and
   wherein the isolation transformer, the pair of transistors, and the resonance capacitor form an isolation ac-to-dc inverter.

3. The power electronic drive circuit of claim 2 wherein the controller is further configured to cause the isolation ac-to-dc inverter to operate in a series resonance mode.

4. The power electronic drive circuit of claim 2 wherein the controller is further configured to cause the isolation ac-to-dc inverter to operate in one of a parallel resonance mode and a series-parallel resonance mode.

5. The power electronic drive circuit of claim 2 wherein the charging system further comprises a full-wave rectifier, wherein the isolation ac-to-dc inverter and the full-wave rectifier form an isolation dc-to-dc converter.

6. The power electronic drive circuit of claim 1 wherein the controller is further configured to cause the first bi-directional dc-to-dc voltage converter of the one or more bi-directional dc-to-dc voltage converters to:
boost a storage voltage from the first energy storage device; and
supply the boosted storage voltage to the dc bus.

7. The power electronic drive circuit of claim 6 wherein the controller is further configured to cause the first bi-directional dc-to-dc voltage converter of the one or more bi-directional dc-to-dc voltage converters to:
buck a first dc voltage on the dc bus to a second dc voltage suitable for charging the first energy storage device; and
supply the second dc voltage to the first energy storage device.

8. The power electronic drive circuit of claim 7 wherein the first electromechanical device is configured to supply an ac regenerative voltage to the first bi-directional dc-to-ac voltage inverter; and
wherein the first bi-directional dc-to-ac voltage inverter is configured to invert the ac regenerative voltage into the first dc voltage and supply the first dc voltage to the dc bus.

9. The power electronic drive circuit of claim 7 further comprising:
a second bi-directional dc-to-ac voltage inverter coupled to the dc bus; and
a second electromechanical device coupled to the second bi-directional dc-to-ac voltage inverter.

10. The power electronic drive circuit of claim 7 wherein the controller is further configured to cause a second bi-directional dc-to-dc voltage converter of the one or more bi-directional dc-to-dc voltage converters to:
boost a storage voltage from the first energy storage device;
supply the boosted storage voltage to the dc bus;
boost a charging voltage from the charging system;
supply the boosted charging voltage to the dc bus.

11. The power electronic drive circuit of claim 7 further comprising:
a second bi-directional dc-to-dc voltage converter of the one or more bi-directional dc-to-dc voltage converters comprising a pair of diodes coupled between a first conductor and a second conductor of the dc bus;
a third bi-directional dc-to-dc voltage converter of the one or more bi-directional dc-to-dc voltage converters comprising a pair of diodes coupled between the first and second conductors of the dc bus;
wherein the pairs of diodes of the second and third bi-directional dc-to-dc voltage converters of the one or more bi-directional dc-to-dc voltage converters are configured to rectify an ac voltage supplied by the charge bus into a fully-rectified dc voltage; and
wherein the controller is further configured to cause the second and third bi-directional dc-to-dc voltage converters of the one or more bi-directional dc-to-dc voltage converters to:
boost a storage voltage from the first energy storage device;
supply the boosted storage voltage to the dc bus.

12. The power electronic drive circuit of claim 1 further comprising a second energy storage device coupled between the pair of conductors of the dc bus, wherein the second energy storage device has a higher voltage then the first energy storage device.

13. The power electronic drive circuit of claim 1 wherein the first electromechanical device comprises one of a traction motor and an alternator.

14. A method of manufacturing a power electronic drive circuit comprising:
coupling a first dc energy storage device to a dc bus;
coupling a first bi-directional dc-to-ac voltage inverter to the dc bus;
coupling a first electromechanical device to the first bi-directional dc-to-ac voltage inverter, the first electromechanical device configured to convert mechanical energy into electrical energy and configured to convert electrical energy into mechanical energy;
coupling one or more bi-directional dc-to-dc voltage converters to the dc bus; and
coupling a charging circuit to the dc bus via a charge bus, the charging system comprising:
a receptacle configured to mate with an external voltage source connector; and
a transformer configured to electrically isolate the charge bus from the receptacle;
configuring a controller to cause the charging system to supply a charging voltage to the dc bus based on a voltage received from the external voltage source; and
configuring the controller to cause one of the first bi-directional dc-to-ac voltage inverter and the one or more bi-directional dc-to-dc voltage converters to:
buck the charging voltage to a second charging voltage and supply the second charging voltage to the dc bus, when a voltage of the charge bus is above the voltage of the dc bus; and
boost the charging voltage to a third charging voltage and supply the third charging voltage to the dc bus, when the voltage of the charge bus is below the voltage of the dc bus;
wherein the voltage of the dc bus is greater than that of the first energy storage device.

15. The method of claim 14 wherein coupling the charging circuit to the dc bus comprises coupling a series resonant inverter to the charge bus, the series resonant inverter comprising:
a pair of switches coupled to the controller;
a resonant capacitor; and
the transformer.

16. The method of claim 14 further comprising:
coupling a first bi-directional dc-to-dc voltage converter of the one or more bi-directional dc-to-dc voltage converters to the dc bus; and
configuring the controller to cause the first bi-directional dc-to-dc voltage converter to buck the voltage of the dc bus to a lower voltage suitable for charging the first dc energy storage device.

17. The method of claim 14 further comprising:
coupling a second bi-directional dc-to-dc voltage converter of the one or more bi-directional dc-to-dc converters to the dc bus, the second bi-directional dc-to-dc voltage converter comprising a first pair of diodes coupled to the dc bus;
coupling a third bi-directional dc-to-dc voltage converter of the one or more bi-directional dc-to-dc converters to the dc bus, the third bi-directional dc-to-dc voltage converter comprising a second pair of diodes coupled to the dc bus; and wherein coupling the charging circuit to the dc bus via the charge bus comprises coupling the charge bus to the first and second pair of diodes.

18. The method of claim 14 wherein the receptacle is configured to mate with the external voltage source connector of one of an external ac voltage source and an external dc voltage source.

19. A system comprising:
a machine configured to convert mechanical energy into electrical energy and configured to convert electrical energy into mechanical energy;
a voltage inverter coupled to the machine and configured to convert ac electrical energy into dc electrical energy and to convert dc electrical energy into ac electrical energy;
a dc bus coupled to the voltage inverter;
a first energy storage device coupled to the dc bus;
a charging system comprising:
    a receptacle configured to mate with a plug coupled to a voltage source external to the power electronic drive circuit;
    a full-wave rectifier coupled to the receptacle and configured to rectify a voltage received from the voltage source;
    a dc-to-dc converter coupled to the full-wave rectifier; the dc-to-dc converter comprising an isolation transformer configured to electrically isolate a charge bus from the full-wave rectifier; and
    the charge bus coupled to the dc-to-dc converter and to the dc bus; and a controller configured to cause the dc-to-dc converter to:
        convert a first dc voltage received from the full-wave rectifier to a second dc voltage; and
        supply the second dc voltage to the charge bus; and
one or more bi-directional dc-to-dc voltage converters coupled to the dc bus; and
wherein the controller is further configured to cause one of the voltage inverter and the one or more bi-directional dc-to-dc voltage converters coupled to the dc bus to:
    buck the second dc voltage to a third dc voltage and supply the third dc voltage to the dc bus, when a voltage of the charge bus is above a voltage of the dc bus; and
    boost the second dc voltage to a fourth dc voltage and supply the fourth dc voltage to the dc bus, when a voltage of the charge bus is below a voltage of the dc bus;
wherein the voltage of the dc bus is greater than that of the first energy storage device.

20. A power electronic drive circuit comprising:
a dc bus;
a first energy storage device coupled to the dc bus, the first energy storage device configured to output a dc voltage;
a first bi-directional dc-to-ac voltage inverter coupled to the first energy storage device and to the dc bus;
a first electromechanical device coupled to the first bi-directional dc-to-ac voltage inverter;
a charging system coupled to the dc bus via a charge bus, the charging system comprising:
    a receptacle configured to mate with a connector coupled to a voltage source external to the power electronic drive circuit for generating a first dc voltage; and
    an isolation transformer configured to electrically isolate the charge bus from the receptacle; and
    wherein the first bi-directional dc-to-ac voltage inverter includes rectifying elements for generating a second dc voltage;
a controller configured to cause the charging system to supply a charging voltage to the dc bus based on the first dc voltage received from the voltage source external to the power electronic drive circuit or the second dc voltage received from the rectifying elements of the first bi-directional dc-to-ac voltage inverter; and
one or more bi-directional dc-to-dc voltage converters coupled to the dc bus;
wherein the controller is further configured to cause the one or more bi-directional dc-to-dc converters to:
    buck the charging voltage to a lower charging voltage and supply the lower charging voltage to the dc bus, when a voltage of the charge bus is above a voltage of the dc bus; and
    boost the charging voltage to a higher charging voltage and supply the higher charging voltage to the dc bus, when a voltage of the charge bus is below a voltage of the dc bus; and
wherein, the voltage of the dc bus is greater than that of the first energy storage device.

21. The power electronic drive circuit of claim 20 wherein the charging system further comprises:
a pair of transistors; and
a resonance capacitor; and
wherein the isolation transformer, the pair of transistors, and the resonance capacitor form an isolation ac-to-dc inverter.

22. The power electronic drive circuit of claim 20 wherein the controller is further configured to cause a first bi-directional dc-to-dc voltage converter of the one or more bi-directional dc-to-dc voltage converters to:
boost a storage voltage from the first energy storage device; and
supply the boosted voltage to the dc bus.

23. The power electronic drive circuit of claim 20 further comprising a second energy storage device coupled to the dc bus, wherein the voltage of the second energy storage device is greater than that of the first energy storage device.

* * * * *